Patented Dec. 26, 1950

2,535,417

UNITED STATES PATENT OFFICE 2,535,417

PROCESS FOR THE PRODUCTION OF 1,10-PHENANTHROLINE

Ernst Hodel, Birsfelden, near Basel, and Hans Gysin, Basel, Switzerland, assignors to J. R. Geigy A. G., Basel, Switzerland, a Swiss firm No Drawing. Application February 27, 1950, Serial No. 146,628. In Switzerland March 4, 1949

5 Claims. (Cl. 260—288)

1.10-phenanthroline was first produced by Blau (Monatshefte 19, 646, 1898) by condensing o-phenylene diamine with 2 mols of glycerine by means of sulphuric acid in the presence of nitrobenzene, also by condensing 8-aminoquinoline with 1 mol of glycerine under the same reaction conditions. As 8-aminoquinoline is obtained from o-nitraniline by condensation with glycerine and reduction, both processes can be called one and three step processes. Blau also describes a number of metal complex compounds of 1.10-phenanthroline. The iron-phenanthroline complex is later suggested as reversible Redox indicator, the ferrous step is brilliant red coloured, the ferric step is blue. (Walden. Hammett and Chapmann, J Am. Chem. Soc. 53, 3998, 1931 and Walden and Co-worker, J. Am. Chem. Soc. 56, 1092, 1934).

The suitability of 1.10-phenanthroline for analytical purpose and also the colouring of bacteria caused Frederick G. Smith and C. A. Getz (Chem. Rev. 16, 113 (1935) to thoroughly test the possibility of improving the phenanthroline synthesis with which up to then the yields had merely amounted to 7 to 8%, calculated on the mononuclear starting product. They were able to attain yields of about 20% in a three step process whereby a yield of ca. 40% was obtained on condensing 8-aminoquinoline with glycerine. The authors used arsenic pentoxide as dehydrogenating agent, and the reduction of 8-nitroquinoline was carried out with iron powder and hydrochloric acid. Knueppel had already used arsenic acid instead of nitrobenzene to produce 8-nitroquinoline (Ber 29, 705, 1896). Darzens and Mayer, C. r. 16, 1428, 1934) used sodium nitrobenzene sulphonate as another water soluble dehydrogenating agent for Skraup's quinoline synthesis. These dehydrogenating agents have the advantage over nitrobenzene that their reduction products can be more easily separated from raw phenanthroline. However, this is obtained in a very impure form and the troublesome isolation from the resinous raw product is an additional difficulty and reduces the yields.

It has now been discovered that 1.10-phenanthroline can be produced with much better yields and more easily worked up by condensing o-phenylenediamine or 8-aminoquinoline with glycerine, e. g by means of sulphuric acid, in the presence of the usual dehydrogenating agents such as nitrobenzene sulphonic acid or arsenic acid, if the condensation is done in the presence of copper-(II)-salts, e. g. copper sulphate or copper chloride, and the 1.10-phenanthroline isolated in the form of its copper complex compound. It can be liberated from the complex compound with hydrogen sulphide by methods known per se and purified by distillation or recrystallisation, for example, in water.

In this way, by the use of nitrobenzene sulphonic acid as dehydrogenating agent, a yield of more than 30% of the theoretical calculated on o-phenylenediamine and one of about 25% by the use of arsenic acid can be obtained. A yield of 60% is obtained when 8-aminoquinoline is used as starting product.

This is a three or fourfold increase over the previous one step process and also over the three step process as the yield is increased at least one and a half times.

It is advantageous to so choose the concentration of sulphuric acid having regard to the water content of the copper salt and, if need be, to that of the glycerine so that a concentration of 60–70% results.

The most suitable temperature for the reaction is 130–140° C., i. e. at or just under the boiling point of the reaction mixture. For each mol of the amino groups capable of condensation, ca. 1.5–2.5 mols glycerine and 1–1.5 mols nitrobenzene sulphonic acid or arsenic acid are used. 1–1.25 mol copper salt per mol of starting product is sufficient. The 8–15 times more sulphuric acid than starting product guarantees that the reaction mixture liquid is sufficiently thin.

The improvement in yield is not due merely to an improvement of the isolation of the phenanthroline from the reaction mixture, as the addition of copper sulphate after the reaction causes nothing like so great an increase in the yield as occurs in the presence of copper salts during condensation both by the use of arsenic acid and also in particular of nitrobenzene sulphonic acid as dehydrogenating agents.

The following examples should illustrate two methods of carrying out this invention without limiting it to them. Parts mentioned therein are parts by weight and temperatures are given in degrees centigrade.

Example 1

246 parts of nitrobenzene are heated to 100° with 620 parts 26% oleum while stirring until a sample of the mixture dissolves clearly in water.

The mixture is then cooled and 950 parts of 64% sulphuric acid, 110 parts of o-phenylenediamine and 355 parts of 90% glycerine are added.

This mixture is then heated to 110–120° and 300 parts of crystallised copper sulphate are added whereupon the reaction mixture becomes thick, but on further heating again becomes a thin liquid. Afterwards it is heated for 4 hours under reflux, i. e. at about 140° while stirring. The mixture, cooled to about 60°, is then poured into 5,000 parts of water and allowed to stand. After about 24 hours the separated black phenanthroline copper complex salt together with similarly separated hydroxy metanilic acid is filtered off. The sediment is suspended in diluted sulphuric acid and disintegrated by the addition of hydrogen sulphide or by dropping in sodium sulphide solution. The precipitated copper sulphide is filtered, whereupon after treating the filtrate with animal charcoal, 1.10-phenanthroline is liberated with lyes, for example caustic soda lye, and shaken out with chloroform. After evaporation of the solvent, a reddish coloured crystallised mass remains, which, recrystallised in water produces a yield of over 30% 1.10-phenanthroline hydrate. The dehydrated 1.10-phenanthroline melts at 117–118°.

*Example 2*

A mixture of 900 parts of sulphuric acid, 108 parts of o-phenylenediamine, 320 parts of dehydrated glycerine and 300 parts of dry arsenic acid is heated to 100–110° and then 300 parts of crystallised copper sulphate are added. The temperature is then raised. At about 130° a strong reaction takes place, so that heating must be discontinued and, if necessary, the mixture allowed to cool. On completion of the reaction, the reaction mixture is heated for a further 3 hours at 140°. The mixture is then cooled to about 60°, poured in to 5,000 parts of water and allowed to stand. After about 24 hours, the precipitated phenanthroline copper complex salt is filtered off, suspended in diluted sulphuric acid and sodium sulphide solution is added dropwise. The precipitated copper sulphide is then filtered off and a yield of about 25% of o-phenanthroline is obtained from the filtrate by the method described in Example 1.

*Example 3*

184 parts of nitrobenzene are heated to 100° with 476 parts 26% oleum while stirring until a sample of the reaction mixture is clearly soluble in water. It is then cooled and 965 parts 62% sulphuric acid, 144 parts 8-aminoquinoline and 235 parts of 90% glycerine are added. (The 8-aminoquinoline is obtainable, e. g. from 8-nitroquinoline by reduction with iron powder and hydrochloric acid according to Claus and Setzer, J. Chemie (2) 53, 400 (1896) or from 8-hydroxyquinoline by reacting with ammonium sulphite solution at 140–150° (N. N. Woroshtzow and J. M. Kogan, B. 65, 142 (1932)). Thereafter the mixture is heated to 110° and 250 parts crystallised copper sulphate are added whereupon the reaction mixture becomes thick but on further heating again becomes a thin liquid. The mixture is heated for 4 hours at 130–140° under reflux while stirring. After this time, a diazotised sample of the reaction mixture should no longer couple with R-salt. When this state is reached, the mixture is cooled to 90–100° and poured into 3000 parts water. After standing for 12 hours the separated green-grey complex compound together with some hydroxy metanilic acid which has also separated, can be filtered off. The sediment is suspended in diluted sulphuric acid and disintegrated by the addition of hydrogen sulphide or by dropping in sodium sulphide solution. The precipitated copper sulphide is filtered off and after treating the filtrate with animal charcoal, 1.10-phenanthroline is liberated with lyes, e. g. caustic soda lye. The free base can then either be extracted with chloroform and after evaporation of the solvent, recrystallised from firstly water, and then diluted acetone, or it can be allowed to solidify, filtered, distilled in a high vacuum and finally recrystallised from diluted acetone. By the first method a yield of 52–57% 1.10-phenanthroline is obtained in the form of its hydrate which is increased to 60–65% by the second method.

What we claim is:

1. Process for the manufacture of 1.10-phenanthroline by condensation of a starting material selected from the group consisting of o-phenylenediamine and 8-aminoquinoline together with glycerine in the presence of a Skraup dehydrogenating agent selected from the group consisting of nitrobenzene sulphonic acid and arsenic acid, characterised in that the condensation is carried out in 60–70% sulphuric acid as condensing agent at a temperature of about 120–140° C. and in the presence of an inorganic salt of bivalent copper sufficient in amount to transform all phenanthroline into its copper complex compound, isolating the phenanthroline copper complex and separating the 1.10-phenanthroline by decomposition of the complex.

2. Process as claimed in claim 1 in which 1–1.25 mol of a copper salt is used per mol of the starting material.

3. Process as claimed in claim 1 in which cupric sulphate is used.

4. Process as claimed in claim 3 in which cupric chloride is used.

5. Process as claimed in claim 1 in which the 1.10-phenanthroline is obtained from the phenanthroline copper complex by decomposition by means of hydrogen sulphide.

ERNST HODEL.
HANS GYSIN.

No references cited.